(12) United States Patent
Reisser

(10) Patent No.: US 8,176,892 B2
(45) Date of Patent: May 15, 2012

(54) INTERNAL COMBUSTION ENGINE

(76) Inventor: Heinz-Gustav A. Reisser, Coshocton, OH (US)

(*) Notice: Subject to any disclaimer, the term of this patent is extended or adjusted under 35 U.S.C. 154(b) by 1117 days.

(21) Appl. No.: 11/448,855

(22) Filed: Jun. 8, 2006

(65) Prior Publication Data

US 2007/0283922 A1 Dec. 13, 2007

(51) Int. Cl.
*F02B 53/00* (2006.01)
*F02B 53/04* (2006.01)

(52) U.S. Cl. .................. 123/223; 123/241; 123/245

(58) Field of Classification Search .............. 123/223, 123/232, 241, 242, 245
See application file for complete search history.

(56) References Cited

U.S. PATENT DOCUMENTS

| | | | | |
|---|---|---|---|---|
| 2,413,590 A * | 12/1946 | Snyder | .......................... | 418/151 |
| 2,416,846 A * | 3/1947 | Richter | ...................... | 123/18 A |
| 3,307,525 A * | 3/1967 | McClure | ..................... | 418/61.3 |
| 3,807,368 A * | 4/1974 | Johnson | ........................ | 123/245 |
| 4,419,057 A * | 12/1983 | Menioux | .......................... | 418/36 |
| 6,164,263 A * | 12/2000 | Saint-Hilaire et al. | ......... | 123/241 |
| 6,895,922 B1 * | 5/2005 | Stoughton et al. | ............ | 123/241 |

* cited by examiner

*Primary Examiner* — Hoang Nguyen

(74) *Attorney, Agent, or Firm* — Kegler Brown Hill & Ritter; James J. Pingor

(57) ABSTRACT

The invention concerns an internal-combustion engine, the engine comprising an engine housing having a combustion chamber and a piston travelling within the combustion chamber along a path of movement delimited between an upper dead center position and a lower dead center position. The engine housing comprises a first housing part and a second housing part, the first housing part and the second housing part delimiting portions of the combustion chamber, abutting each other, and defining a parting plane, the parting plane being arranged parallel to the path of movement of the piston.

20 Claims, 4 Drawing Sheets

INTERNAL COMBUSTION ENGINE

BACKGROUND OF THE INVENTION

The invention concerns an internal-combustion engine, the engine having an engine housing defining a combustion chamber. A piston travels within the combustion chamber along a path of movement delimited between an upper dead center position and a lower dead center position. The engine housing comprises a first housing part and a second housing part that delimit portions of the combustion chamber, which abut each other, and which define a parting plane.

Conventional internal-combustion engines comprise an engine housing, which consists of several housing parts. These engines have a first housing part, also known as cylinder block, which has bores to define cylindrical combustion chambers. A second housing part, also known as cylinder head, is connected to the first housing part.

It is the object of this invention to provide an internal-combustion engine that can be manufactured in a very flexible manner.

SUMMARY OF THE INVENTION

This object is achieved in accordance with the invention with a combustion engine of the above-mentioned type by an engine with a parting plane being arranged parallel to the path of movement of the piston.

In contrast to conventional engines, the parting plane between the housing parts of the engine housing does not have an orientation, which is perpendicular to the path of movement of the piston in the combustion chamber. By arranging this parting plane parallel to the path of movement of the piston, it is possible to manufacture an engine having a desired number of combustion chambers by arranging pairs of first and second housing parts parallel to each other. This means that a one-cylinder engine having one combustion chamber comprises a first and a second housing part and that engines having a higher number of combustion chambers would be provided by corresponding third and fourth or fifth and sixth housing parts for second and third cylinders, and so on.

According to a particularly preferred embodiment, the path of motion of the piston lies within the parting plane. This allows for a very easy manufacturing of the housing parts, since the parting plane divides the combustion chamber into two halves, which can be manufactured without undercuts. For example, for combustion chambers having a circular cross-section each housing part would define one half of the combustion chamber and, therefore, have a cross-section that is semi-circular. Of course, other cross-sections of the combustion chamber are possible, for example oval, square or rectangular.

The path of movement of the piston when travelling between an upper dead center position and a lower dead center position is preferably not straight, as in conventional engines, but rather curved. This allows for a particularly compact engine, especially if two pistons delimit the combustion chamber. This means that the housing parts of the engine housing define a curved cavity that is delimited by a first piston at one end and by a second piston at the opposite end.

At least one piston drives a piston connecting rod, which pivots around a pivot axis, to transfer the movement of the piston or the pistons to components driven by the engine, for example a gear drive of a car. A curved path of movement of a piston can thereby be provided.

According to a further embodiment of the invention, the piston connecting rod drives a crankshaft via connecting means, which in one embodiment can be a connecting rod.

When the housing parts define not only one, but two or even more combustion chambers, the size of the engine is further decreased. By joining the two housing parts, an engine can thereby be provided having at least two combustion chambers.

As explained earlier, the engine can comprise at least one pair of a first housing part and a second housing part. Depending on the number of combustion chambers that the two housing parts define, an engine can be created with a desired number of combustion chambers by providing a particular number of pairs of housing parts.

According to a preferred embodiment of the invention, the housing parts are arranged between outer backing plates. These backing plates encompass the housing parts, enhance the stability of the engine and allow for the arrangement of other parts of the engine, for example bearings for the pivot axis and/or for at least one crankshaft. Cooling channels can also be provided, not only in the housing part, but also in the backing plates.

The engine according to the invention can be operated according to a two-cycle or four-cycle principle and can be an Otto or a diesel engine.

Further advantages, features and details of the invention can be extracted from the dependent claims and the following description, which describes in detail a particularly preferred embodiment with reference to the drawing. The features shown in the drawing and mentioned in the claims and in the description may be essential to the invention either individually or in arbitrary combination.

DESCRIPTION OF THE PREFERRED EMBODIMENT

Figure 1:
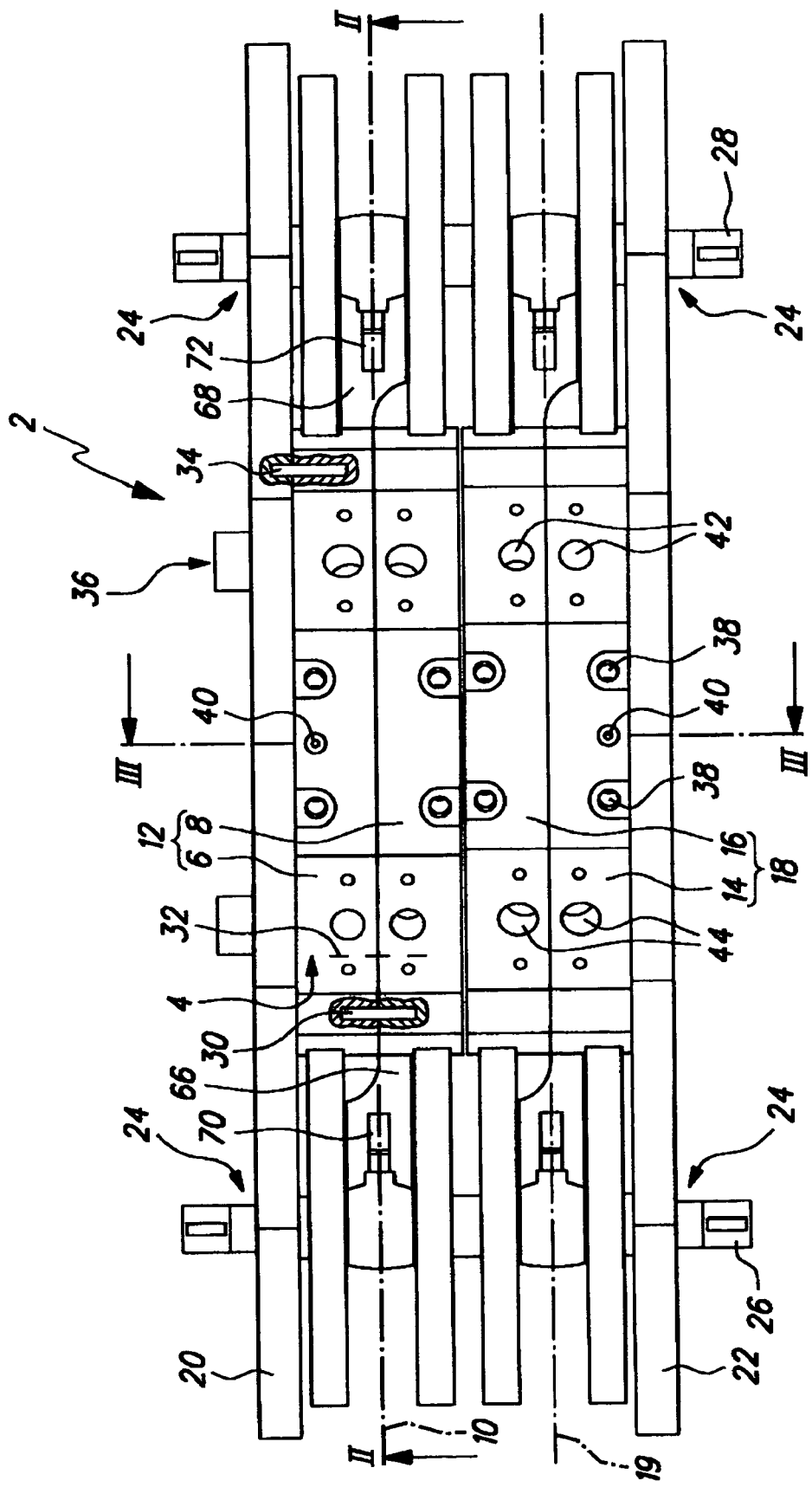
FIG. 1 shows a schematic top view of a combustion engine according to the invention.

FIG. 1 shows an engine 2 with an engine housing 4. The engine housing 4 has a first housing part 6 and a second housing part 8 extending parallel to the first housing part 6. The housing parts 6 and 8 abut each other and define, between each other, a parting plane 10.

The housing parts 6 and 8 are part of a first pair 12 of housing parts. Further housing parts 14 and 16 are provided, which are part of a second pair 18 of housing parts. A parting plane 19 is defined between the housing parts 14 and 16.

Two backing plates 20 and 22 border the housing parts 6, 8, 14 and 16. Bearings 24 are provided in these backing plates for a first crankshaft 26 and a second crankshaft 28 of the engine 2.

A pin connection 30 is provided to align the housing parts 6 and 8 with each other. A corresponding pin connection is provided for the housing parts 14 and 16. A connection 32 is provided to fix the housing parts 6 and 8 to one another and may comprise a screw engaging in a corresponding thread.

A pin connection 34 is provided to align the housing part 6 with the backing plate 20. Connections 36, which may comprise screws engaging in corresponding threads, may be provided to connect all housing parts and the backing plates 20 and 22 to each other.

In FIG. 1 shows two fuel injectors 40, which are assigned to combustion chambers located within the engine housing 4 (described further below with respect to FIGS. 2 and 3). Inlet ports 42 and outlet ports 44 are provided at both sides of the fuel injectors 40.

Figure 2:
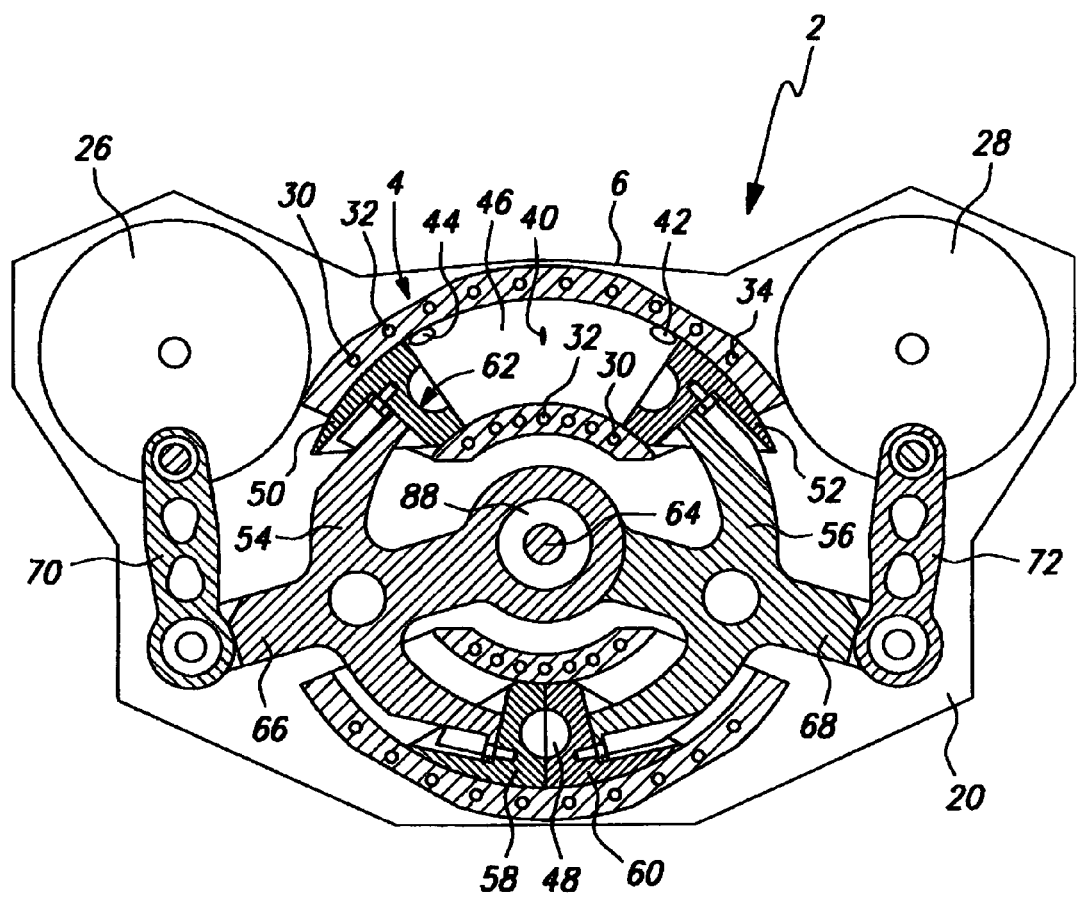
FIG. 2 shows a section taken along line II-II as indicated in FIG. 1.

With respect to FIG. 2, the housing part 6 and the housing part 8 (which is shown in FIG. 1) define a first combustion chamber 46. The housing parts 6 and 8 define a further combustion chamber 48, which is arranged opposite the combustion chamber 46. The first combustion chamber 46 is delimited by a first piston 50 at one end of the combustion chamber and by a second piston 52 at the opposite end.

The piston 50 is connected to a first piston connecting rod 54, while the piston 52 is connected with a second piston connecting rod 56. The first piston connecting rod 54 is connected to a third piston 58 delimiting the second combustion chamber 48. The combustion chamber 48 is also delimited by a fourth piston 60, which is connected to the second piston connecting rod 56. All pistons 48, 50, 58 and 60 have semicircular indentations 62, which face the corresponding combustion chambers 46 and 48.

In FIG. 2 pistons 50 and 52 are shown in their lower dead center positions. Accordingly, the pistons 58 and 60 are shown in their upper dead center positions. When igniting fuel contained in the combustion chamber 48, the two pistons 58 and 60 are driven apart and guided along a curved path that is defined by the shape of the combustion chambers 48 and 46. The pistons 58 and 60 drive the piston connecting rods 54 and 56, so that the pistons 50 and 52 move from their lower dead center positions into their upper dead center positions. An ignition in the combustion chamber 46 will force the pistons 50 and 52 away from each other, thereby driving pistons 58 and 60 towards each other and so on. The movement of the pistons is transferred to the piston connecting rods 54 and 56, which pivot around a central pivot axis 64. The piston connecting rods 54 and 56 comprise arms extending radially outward and are linked to connecting rods 70 and 72, respectively, which in turn are linked to the first crankshaft 26 and the second crankshaft 28, respectively.

Figure 3:
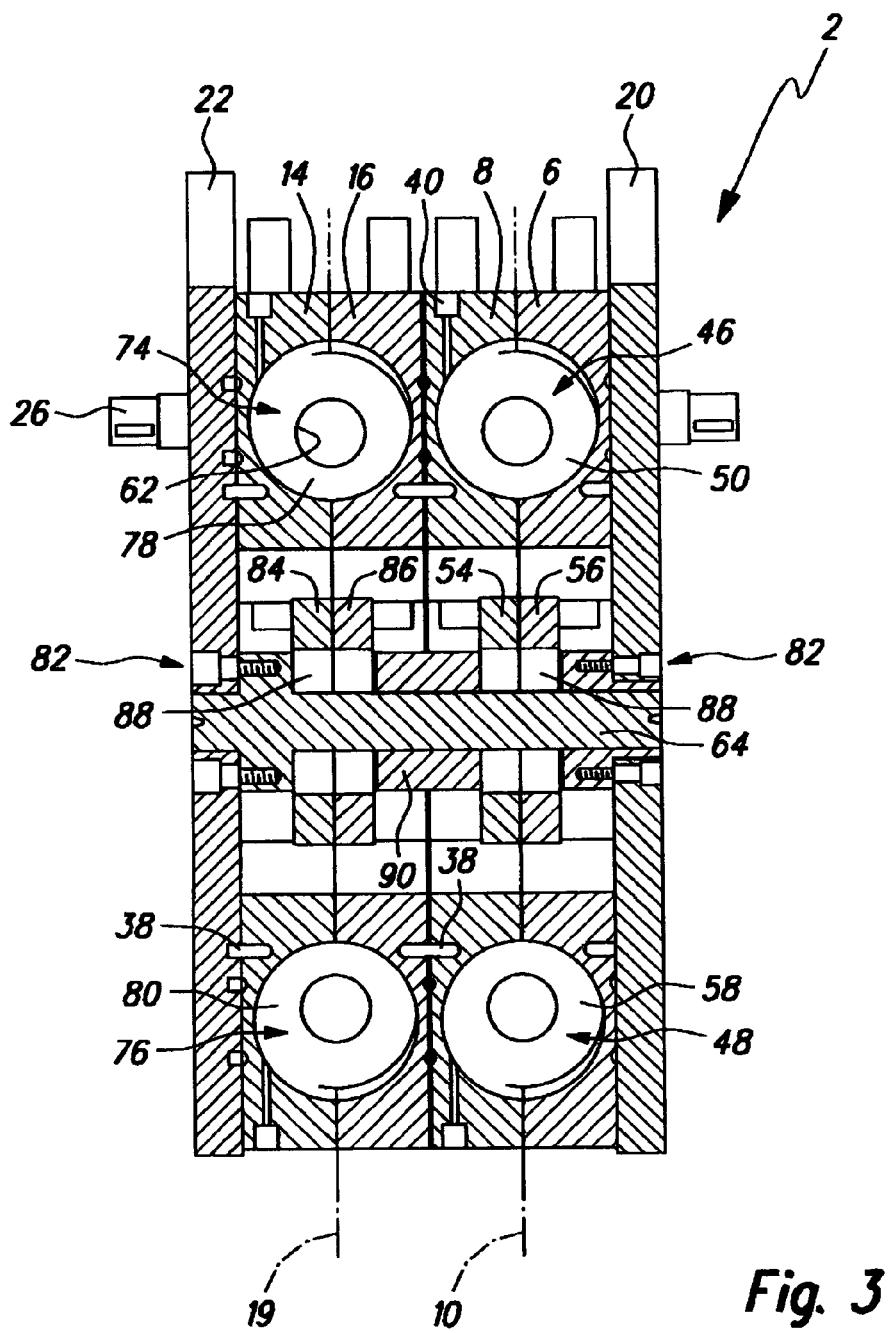
FIG. 3 shows a section taken along line III-III as indicated in FIG. 1.

With respect to FIG. 3, the housing parts 6 and 8 define the two combustion chambers 46 and 48. The housing parts 14 and 16, which are also shown in FIG. 1, define a third combustion chamber 74 and a fourth combustion chamber 76. These combustion chambers are delimited by a fifth piston 78 and a sixth piston 80, respectively and by two further pistons arranged opposite the pistons 78 and 80, which are not shown in the drawing. The housing parts 6, 8, 14 and 16 thereby create a four-cylinder engine 2.

In FIG. 3 the pivot axis 64, which is also shown in FIG. 2, is shown in cross-section. This pivot axis is connected to the backing plates 20 and 22 by means of screws 82. The piston connecting rods 54 and 56 can pivot around the pivot axis 64 as described above with respect to FIG. 2.

In FIG. 3 parts of two further piston connecting rods, i.e. a third piston connecting rod 84 and a fourth piston connecting rod 86, are shown. The third piston connecting rod 84 is connected to the fifth piston 78 and the sixth piston 80. The fourth piston connecting rod 86 is connected to two pistons, which also delimit the combustion chambers 74 and 76 (not shown in FIG. 3).

All piston connecting rods 54, 56, 84 and 86 pivot around the pivot axis 64 by means of bearings 88. The piston connecting rods 54 and 86 are held in their position by means of an intermediate, ring-shaped spacer 90.

Figure 4:
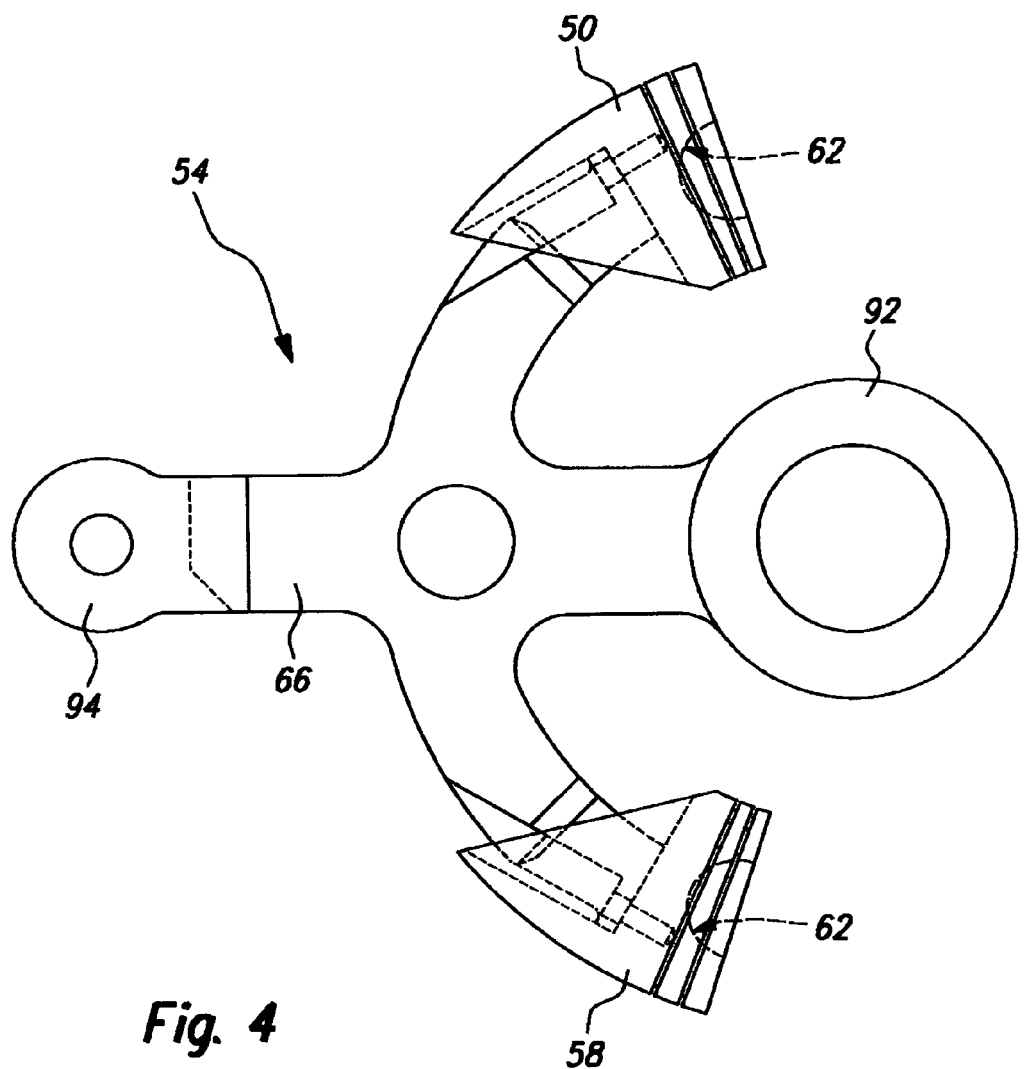
FIG. 4 shows a top view of a piston connecting rod of the combustion engine according to FIG. 1.

In FIG. 4 the piston connecting rod 54 is shown in greater detail. It comprises a ring-shaped end portion 92, which encompasses the bearing 88, as shown in FIG. 3. At the opposite end, the piston connecting rod 54 comprises a ring-shaped end portion 94, in which area the piston connecting rod 54 is connected to the connecting rod 70.

I claim:

1. An internal-combustion engine, the engine comprising:
   an engine housing defining a combustion chamber, said engine housing having a first housing part and a second housing part;
   a first piston and a second piston disposed within said combustion chamber to travel along paths between upper dead center positions and lower dead center positions, wherein said paths of travel are curved;
   a first crankshaft coupled to the first piston; and
   a second crankshaft coupled to the second piston,
   wherein said first housing part and said second housing part delimit portions of said combustion chamber and abut each other to define a parting plane, portions of said combustion chamber being further delimited by said first piston at a first end of said combustion chamber and by said second piston at a second end of said combustion chamber, said second end being disposed opposite said first end, said parting plane extending through said pistons, and the first and second crankshafts are located outside a region defined by extension of the curved paths of travel perpendicular to the parting plane.

2. The combustion engine of claim 1, wherein said paths of travel lie within said parting plane, said parting plane extending through said pistons when said pistons travel along said paths of travel.

3. The combustion engine of claim 1, wherein at least one of said first and second pistons drive first and second connecting rods, said first and second piston connecting rods pivoting around a pivot axis.

4. The combustion engine of claim 3, wherein said piston connecting rods drive the first and second crankshafts.

5. The combustion engine of claim 1, wherein said housing parts define two combustion chambers.

6. The combustion engine of claim 1, wherein at least two pairs of said first housing part and said second housing part are provided.

7. The combustion engine of claim 1, wherein said housing parts are disposed between outer backing plates.

8. The combustion engine of claim 4, wherein said housing parts are disposed between outer backing plates, with bearings for said pivot axis and/or said crankshafts being disposed at or in at least one of said backing plates.

9. The combustion engine of claim 7, wherein cooling channels are provided in said housing parts and/or said backing plates.

10. The combustion engine of claim 1, wherein the engine is a two-cycle, a four-cycle, an Otto or a diesel engine.

11. The combustion engine of claim 1, wherein each of said housing parts forms a semi-circular cavity on a side that defines said combustion chamber, and said combustion chamber has a circular cross section defined by said semi-circular cavities of said housing parts.

12. The combustion engine of claim 11, wherein each of said first and second pistons has a circular cross-sectional shape corresponding to said circular cross section of said combustion chamber.

13. The combustion engine of claim 1, wherein each of said first and second pistons comprise portions forming indentations that face said combustion chamber.

14. The combustion engine of claim 13, wherein said indentations are semi-circular.

15. The combustion engine of claim 1, wherein said combustion engine is configured to provide fuel to said combustion chamber, and said first and second pistons are driven apart upon ignition of said fuel in said combustion chamber.

16. An internal-combustion engine, the engine comprising:
   a pair of backing plates arranged parallel to each other; and
   at least one engine component disposed between the pair of backing plates, each engine component comprising:
      an engine housing defining a combustion chamber, said engine housing having a first housing part and a second housing part;
      a first piston and a second piston disposed within said combustion chamber to travel along paths between upper dead center positions and lower dead center positions, wherein the first and second pistons oscillate between the upper dead center positions and the lower dead center positions;
      a first crankshaft coupled to the first piston; and
      a second crankshaft coupled to the second piston,
   wherein said first housing part and said second housing part delimit portions of said combustion chamber and abut each other to define a parting plane, portions of said combustion chamber being further delimited by said first piston at a first end of said combustion chamber and by said second piston at a second end of said combustion chamber, said second end being disposed opposite said first end, and said parting plane extending through said pistons.

17. The engine of claim 16, wherein the at least one engine component comprises two or more engine components, wherein the two or more engine components are arranged parallel to each other.

18. The engine of claim 16, wherein each of said first and second pistons comprise portions forming indentations that face said combustion chamber.

19. The engine of claim 16, wherein the first crankshaft is coupled to the first piston by a first connecting rod, the second crankshaft is coupled to the second piston by a second connecting rod, and wherein the first and the second connecting rods pivot around a central pivot axis.

20. A method, comprising:
   defining a combustion chamber with an engine housing, said engine housing having a first housing part and a second housing part;
   disposing a first piston and a second piston within said combustion chamber to travel along paths between upper dead center positions and lower dead center positions, wherein said paths of travel are curved;
   coupling a first crankshaft to the first piston; and
   coupling a second crankshaft to the second piston,
wherein said first housing part and said second housing part delimit portions of said combustion chamber and abut each other to define a parting plane, portions of said combustion chamber being further delimited by said first piston at a first end of said combustion chamber and by said second piston at a second end of said combustion chamber, said second end being disposed opposite said first end, said parting plane extending through said pistons, and the first and second crankshafts are located outside a region defined by extension of the curved paths of travel perpendicular to the parting plane.

* * * * *